United States Patent [19]
Ishida

[11] Patent Number: 4,650,306
[45] Date of Patent: Mar. 17, 1987

[54] ELECTROMAGNETICALLY RELEASABLE SHUTTER FOR A CAMERA

[75] Inventor: Hiroaki Ishida, Yotsukaido, Japan

[73] Assignee: Seiko Koki Kabushiki Kaisha, Chiba, Japan

[21] Appl. No.: 726,017

[22] Filed: Apr. 22, 1985

[30] Foreign Application Priority Data

Apr. 23, 1984 [JP] Japan .................................. 59-59525

[51] Int. Cl.⁴ .............................................. G03B 9/08
[52] U.S. Cl. .................................................. 354/234.1
[58] Field of Search ...................... 354/234.1, 230, 231, 354/233

[56] References Cited

U.S. PATENT DOCUMENTS 4,208,111  6/1980  Kitai et al. ...................... 354/230 X

FOREIGN PATENT DOCUMENTS 16437  1/1982  Japan ................................ 354/234.1
60734  4/1983  Japan ................................ 354/234.1

Primary Examiner—Donald A. Griffin
Attorney, Agent, or Firm—Robert E. Burns; Emmanuel J. Lobato; Bruce L. Adams

[57] ABSTRACT

An electromagnetically releasable shutter for a camera comprises an electromagnet (8) which is energized upon the execution of shutter releasing operation and de-energized after an exposure time corresponding to the brightness of the object has elapsed since energization, an armature lever (7) which is driven by the electromagnet (8), an actuating member (4) which starts moving to drive a diaphragm operating member (6) in a direction to open the diaphragm when the armature lever (7) is attracted by the electromagnet (8), and a shutter closing member (9) which drives the diaphragm operating member (6) in a direction to close the diaphragm when the armature lever (7) is released from the electromagnet (8). The actuating member (4) is provided with a part to restrain the operation of the shutter closing member (9) when the actuating member (4) is at the charged position. The armature lever (7) is provided with a part which enters the range of movement of the shutter closing member (9) to restrain the operation of the shutter closing member (9).

14 Claims, 1 Drawing Figure

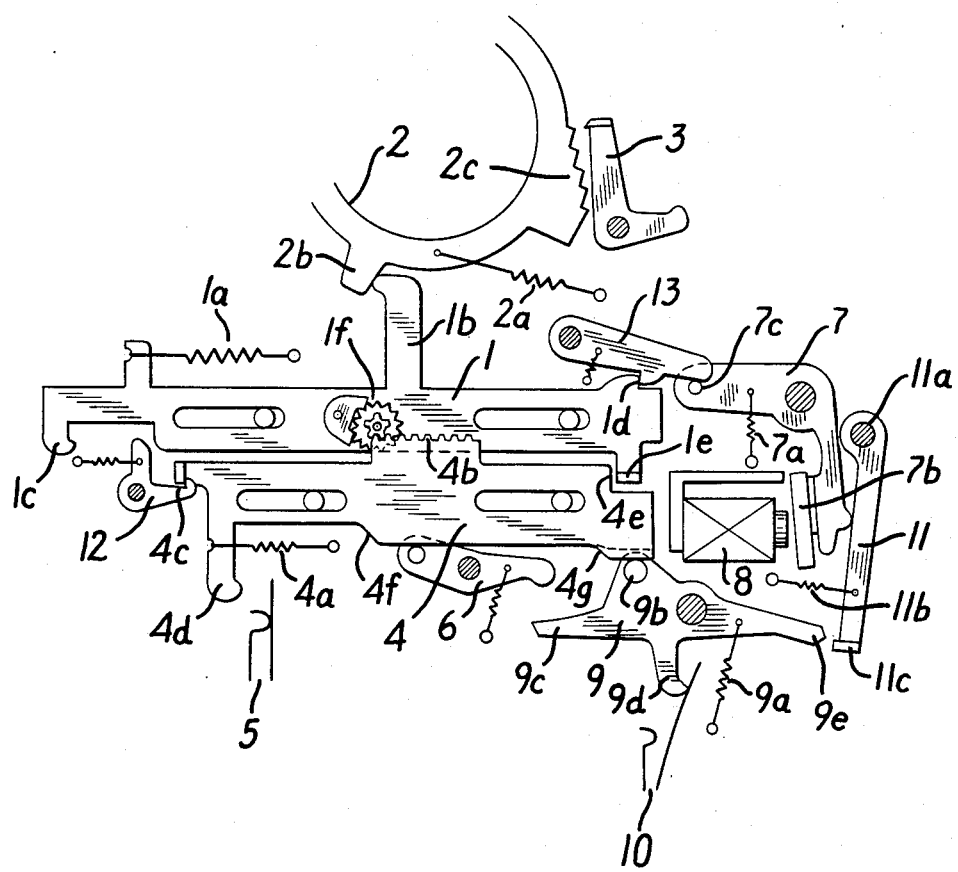

ELECTROMAGNETICALLY RELEASABLE SHUTTER FOR A CAMERA

BACKGROUND OF THE INVENTION

The present invention relates to an electromagnetically releasable shutter for a camera.

A camera equipped with an automatic focusing device capable of carrying out a series of actions from the actuation of a focus adjusting member to the completion of exposure by means of a single electromagnet has been proposed in Utility Model Laid-open No. Sho 55-169515.

The above-mentioned automatic focusing device is designed to carry out the following series of operations. An armature lever is actuated by an electromagnet energized upon the operation of a shutter releasing member, to turn a focus adjusting member through a shutter charging member to a position where the lens is in focus and, on the other hand, to release an actuating member in order to turn a diaphragm operating member in a direction to open the diaphragm with a shutter opening member pivotally supported on the actuating member Upon the de-energization of the electromagnet when a time corresponding to the brightness of an object has elapsed after the energization of the electromagnet, the armature lever releases, by its own tendency, the diaphragm operating member from the shutter opening member to allow the diaphragm operating member to turn in the diaphragm closing direction.

However, since this automatic focusing device is designed to release the diaphragm operating member from the shutter opening member directly upon the de-energization of the electromagnet, only by a biasing force acting on the armature lever, the armature lever must be biased by a considerably large resilient force. Therefore, the electromagnet needs to generate a sufficient attractive force to attract the armature lever against a large resilient force, which entails a large power consumption and causes problems that a long rise time is necessary before the effective action of the electromagnet, and thereby the response of the device is delayed.

SUMMARY OF THE INVENTION

Accordingly, it is an object of the present invention to provide an improved electromagnetically releasable shutter capable of operating by the use of a small electromagnet which requires only a small power consumption and has satisfactory response characteristics.

BRIEF DESCRIPTION OF THE DRAWING

The single FIGURE is an explanatory view of an electromagnetically releasable shutter embodying the present invention, the same being shown in the charged condition.

DESCRIPTION OF THE PREFERRED EMBODIMENT

The present invention will be described in detail with reference to a preferred embodiment thereof in conjunction with the accompanying drawing.

The single FIGURE is a diagrammatic illustration of a preferred embodiment of the present invention. A shutter charging member 1 is disposed for undergoing lateral movement and is urged rightward, as viewed in the FIGURE, with a spring 1a. On the edges of the shutter charging member 1, are formed a projection 1b, a projection 1c for driving a hook 12, a protrusion 1d which engages a hook 13, and a bend 1e. A retarding device 1f consisting of a wheel and an anchor is provided on one side of the shutter charging member 1. A focus adjusting member 2 capable of rotating about the optical axis is urged counterclockwise with a spring 2a. A projection 2b retained by the projection 1b of the shutter charging member 1, and teeth 2c which come into working contact with a lens stopping member 3 of an automatic focusing device are formed on the circumference of the focus adjusting member 2.

An actuating member 4 is disposed for undergoing lateral movement and is urged rightward, as viewed in the FIGURE, with a spring 4a. A rack 4b engaging a gear of the retarding device 1f mounted on the shutter charging member 1, a bend 4c to be caught by the hook 12, a projection 4d for controlling a trigger switch 5, a shoulder 4e which comes into working contact with the bend 1e of the shutter charging member 1, a cam surface 4f for guiding a diaphragm or shutter operating member 6 in a direction to open the diaphragm and a cam surface 4g, the function of which will be explained later, are formed on the edges of the actuating member 4. An armature lever 7 is supported pivotally and is urged counterclockwise with a spring 7a. An armature 7b to be attracted by an electromagnet 8 and a pin 7c for turning the hook 13 against the resilient force of a spring are provided at one end and at the other end of the armature lever 7 respectively.

A shutter closing member 9 is supported pivotally and is urged clockwise with a biasing spring 9a. The shutter closing member 9 has a pin 9b which is in sliding contact with the cam surface 4g of the actuating member 4, a projection 9c for turning the diaphragm operating member 6 in a direction to close the diaphragm a projection 9d for controlling a flash trigger switch 10 and a projection 9e to be caught by a hook 11c of a locking lever 11. The locking lever 11 is supported pivotally on a pivot 11a and is urged with a spring 11b so as to be always in contact with the armature lever 7. When the electromagnet 8 is energized, the hook 11c of the locking lever 11 enters the range of movement of the projection 9e of the shutter closing member 9 positioned at the charged position and therefore blocks the movement of the shutter closing member 9, without interfering with the projection 9e.

The manner of operation of the above-mentioned mechanism will be described hereinafter.

The FIGURE shows the mechanism in the charge condition. Upon the operation of the shutter releasing member of the camera at the initial stage of the shutter releasing operation, the automatic focusing device is actuated to set the lens stopping member 3 at a position corresponding to the object distance, and, at the following stage of the shutter releasing operation, a large electric current is supplied momentarily to the electromagnet 8. Then, the electromagnet 8 attracts the armature 7b, and thereby the armature lever 7 starts turning clockwise to turn the hook 13 with the pin 7c in a direction to release the shutter charging member 1. On the other hand, the locking lever 11 turns clockwise due to the movement of the armature lever 7, so that the hook 11c enters the range of movement of the projection 9e of the shutter closing member 9 as as to block the movement of the shutter closing member 9.

After being released, the shutter charging member 1 starts moving rightward at a speed controlled by the retarding device 1f by being pulled by the spring 1a. As the shutter charging member 1 moves rightward, the projection 1b of the shuter charging member 1 moves away from the focus adjusting member 2 to allow the focus adjusting member 2 to turn counterclockwise by the spring 2a until one of the teeth 2c engages the lens stopping member 3 which has previously been set at an appropriate position, and, near the termination of the rightward movement, the shutter charging member 1 turns the hook 12 clockwise to release the actuating member 4. Then, the actuating member 4 starts moving rightward to a released position by being pulled by the spring 4a under the action of the retarding device 1f. As the actuating member 4 moves rightward, the cam surface 4f allows the diaphragm operating member 6, which is urged clockwise by a biasing spring, to turn clockwise to open the diaphragm and the projection 4d opens the trigger switch 5 to actuate an exposure controlling electric circuit.

The rightward movement of the actuating member 4 causes the shutter closing member 9 to be unlocked and to start turning clockwise as the pin 9b moves along the cam surface 4g. However, as mentioned above, since the hook 11c of the locking lever 11 is within the range of movement of the projection 9e, the shutter closing member 9 is restrained or blocked from turning immediately after being released or locked from the actuating member 4, by the engagement of the projection 9e with the hook 11c of the locking lever 11.

After the lapse of an exposure time corresponding to the brightness of the object, the electromagnet 8 is deenergized. Then, the armature lever 7 is released free from the electromagnet 8 and is turned counterclockwise by the spring 7a turning the locking lever 11 counterclockwise, so that the hook 11c of the blocking lever 11 is retracted from the locking position.

Consequently, the shutter closing member 9 is released free and is turned clockwise rapidly by the biasing spring 9a. At the initial stage of the clockwise turning, the shutter closing member 9 closes the flash trigger switch 10 and turns the diaphragm operating member 6 counterclockwise with the projection 9c to close the diaphragm.

In this embodiment, the locking member 11 is a separate member that follows the movement of the armature 7, however, a locking hook for blocking the shutter closing member 9 may be formed as an extension projecting from the armature 7b of the armature lever 7.

As has been described hereinbefore, according to the present invention, the actuating member which actuates the diaphragm operating member to move in a direction to open the diaphragm upon the attraction of the armature lever by the electromagnet is provided with a part which retains and locks the shutter closing member for moving the diaphragm operating member in a direction to close the diaphragm at the charged position, while the armature lever which is driven by the electromagnet is provided with a part which enters the range of movement of the shutter closing member to restrict or block the motion of the shutter closing member. Therefore, the armature lever needs to be biased with a little force necessary only to release the shutter closing member. Consequently, the electromagnetically releasable shutter of the present invention needs only a small electromagnet of a reduced capacity for attracting the armature lever, which facilitates fitting the electromagnetically releasable shutter into a limited space and reduces power consumption, and thereby the battery replacement period is extended remarkably. Furthermore, since the electromagnet needs only a small electric current for attracting the armature, the rise time of the electromagnet is reduced, which improves the response characteritics of the electromagnetically releasable shutter of this type remarkably.

What is claimed is:

1. An electromagnetically releasable shutter for a camera comprising: an electromagnet energized upon the execution of a shutter releasing operation and deenergized after elapse of an exposure time corresponding to the brightness of an object, an armature lever driven by the electromagnet, an actuating member operative to drive a diaphragm operating member to open a diaphragm when the armature lever is attracted by the electromagnet, and a shutter closing member operative to drive the diaphragm operating member to close the diaphragm when the armature lever is released from the electromagnet, wherein the actuating member has means for restraining the operation of the shutter closing member when the actuating member is at a charged position, and the armature lever has means for blocking the movement of the shutter closing member until the armature lever is released from the electromagnet so as to restrain the operation of the shutter closing member.

2. A camera shutter having a diaphragm for defining an exposure interval, comprising: a shutter operating member for effecting opening movement of the diaphragm; a shutter closing member separate from the shutter operating member for effecting closing movement of the diaphragm; an actuating member movable from a charged position to a released position, the actuating member having means operative at the charged position thereof for locking the shutter operating member and the shutter closing member in inactive states and operative at the released position thereof for activating the shutter operating member to enable the same to effect opening movement of the diaphragm and for unlocking the shutter closing member to place the same in an active state; hook means movable between first and second positions and operative at the first position for blocking the activation of the unlocked shutter closing member during the exposure interval and operative at the second position for enabling the unlocked shutter closing member to effect the closing movement of the diaphragm after the exposure interval; and electromagnetic driving means for driving the actuating member from the charged position to the released position and for driving the hook means to the first position in response to the movement of the actuating member and then driving the hook means to the second position after the exposure interval.

3. A camera shutter according to claim 2; including biasing means for resiliently biasing the shutter operating member to effect the opening movement of the diaphragm.

4. A camera shutter according to claim 2; including biasing means for resiliently biasing the shutter closing member to effect the closing movement of the diaphragm.

5. A camera shutter according to claim 2; wherein the shutter closing member comprises means coacting with the shutter opening member for actuating the same to effect the closing movement of the diaphragm.

6. A camera shutter according to claim 2; wherein the actuating member has a cam surface engageable with the shutter operating member for actuating the same.

7. A camera shutter according to claim 2; wherein the actuating member has a cam surface engageable with the shutter closing member for unlocking the same.

8. A camera shutter according to claim 2; including biasing means for assisting the movement of the actuating member from the charged position to the released position.

9. A camera shutter according to claim 2; including means operative when the actuating member is moved to the released position for counting the exposure interval.

10. A camera shutter according to claim 2; wherein the hook means comprises a pivotable hook engageable with the shutter closing member when the hook is at the first position for blocking the activation of the unlocked shutter closing member.

11. A camera shutter according to claim 2; wherein the electromagnetic driving means comprises an electromagnet and an armature lever activated by the electromagnet.

12. A camera shutter according to claim 11; wherein the armature lever is positioned to drive the actuating member and the hook means.

13. A camera shutter according to claim 12; wherein the armature lever is operative when attracted by the electromagnet to drive the actuating member from the charged position to the released position and to move the hook means to the first position, and is operative when released from the electromagnet to move the hook means to the second position.

14. A camera shutter according to claim 2; including a charging member driven by the electromagnetic driving means for automatically adjusting a focus adjusting member prior to effecting the opening movement of the diaphram.

* * * * *